(12) United States Patent
Katata et al.

(10) Patent No.: US 8,018,826 B2
(45) Date of Patent: Sep. 13, 2011

(54) RECORDING DEVICE AND METHOD, AND COMPUTER PROGRAM

(75) Inventors: Keiji Katata, Saitama (JP); Tatsuhiko Ono, Saitama (JP)

(73) Assignee: Pioneer Corporation, Tokyo (JP)

( * ) Notice: Subject to any disclaimer, the term of this patent is extended or adjusted under 35 U.S.C. 154(b) by 1159 days.

(21) Appl. No.: 11/663,277

(22) PCT Filed: Sep. 21, 2005

(86) PCT No.: PCT/JP2005/017357
§ 371 (c)(1),
(2), (4) Date: May 11, 2007

(87) PCT Pub. No.: WO2006/033342
PCT Pub. Date: Mar. 30, 2006

(65) Prior Publication Data
US 2007/0263510 A1 Nov. 15, 2007

(30) Foreign Application Priority Data
Sep. 21, 2004 (JP) .................................. 2004-273117

(51) Int. Cl.
*G11B 20/18* (2006.01)
(52) U.S. Cl. ...................................................... 369/300
(58) Field of Classification Search .................. 369/300, 369/112.29, 13.02, 112.23, 112.08, 53.41, 369/47.52
See application file for complete search history.

(56) References Cited

U.S. PATENT DOCUMENTS

| | | | |
|---|---|---|---|
| 6,765,850 B2 * | 7/2004 | Shiozawa et al. | 369/47.52 |
| 7,894,161 B2 * | 2/2011 | Biskeborn | 360/130.21 |
| 2002/0186634 A1 * | 12/2002 | Shiozawa et al. | 369/47.52 |
| 2008/0212232 A1 * | 9/2008 | Biskeborn | 360/130.21 |
| 2008/0259494 A1 * | 10/2008 | Biskeborn | 360/122 |
| 2009/0268343 A1 * | 10/2009 | Biskeborn et al. | 360/110 |

FOREIGN PATENT DOCUMENTS

| | | |
|---|---|---|
| JP | 5-54452 | 3/1993 |
| JP | 6-282944 | 10/1994 |
| JP | 2004-319079 | 11/2004 |
| JP | 2005-160060 | 6/2005 |

* cited by examiner

*Primary Examiner* — Allen Cao
(74) *Attorney, Agent, or Firm* — Young & Thompson

(57) ABSTRACT

A recording apparatus is provided with: a recording device for recording record data onto a recording medium, the record data including real-time data which is continuously recorded by a certain amount and management data which is to manage at least one of recording and reproduction of the real-time data; a verifying device for verifying whether or not the recorded record data is accurately recorded; and a first controlling device for controlling the verifying device so as to selectively verify whether or not the management data is accurately recorded, out of the recorded record data.

9 Claims, 7 Drawing Sheets

[FIG. 1]
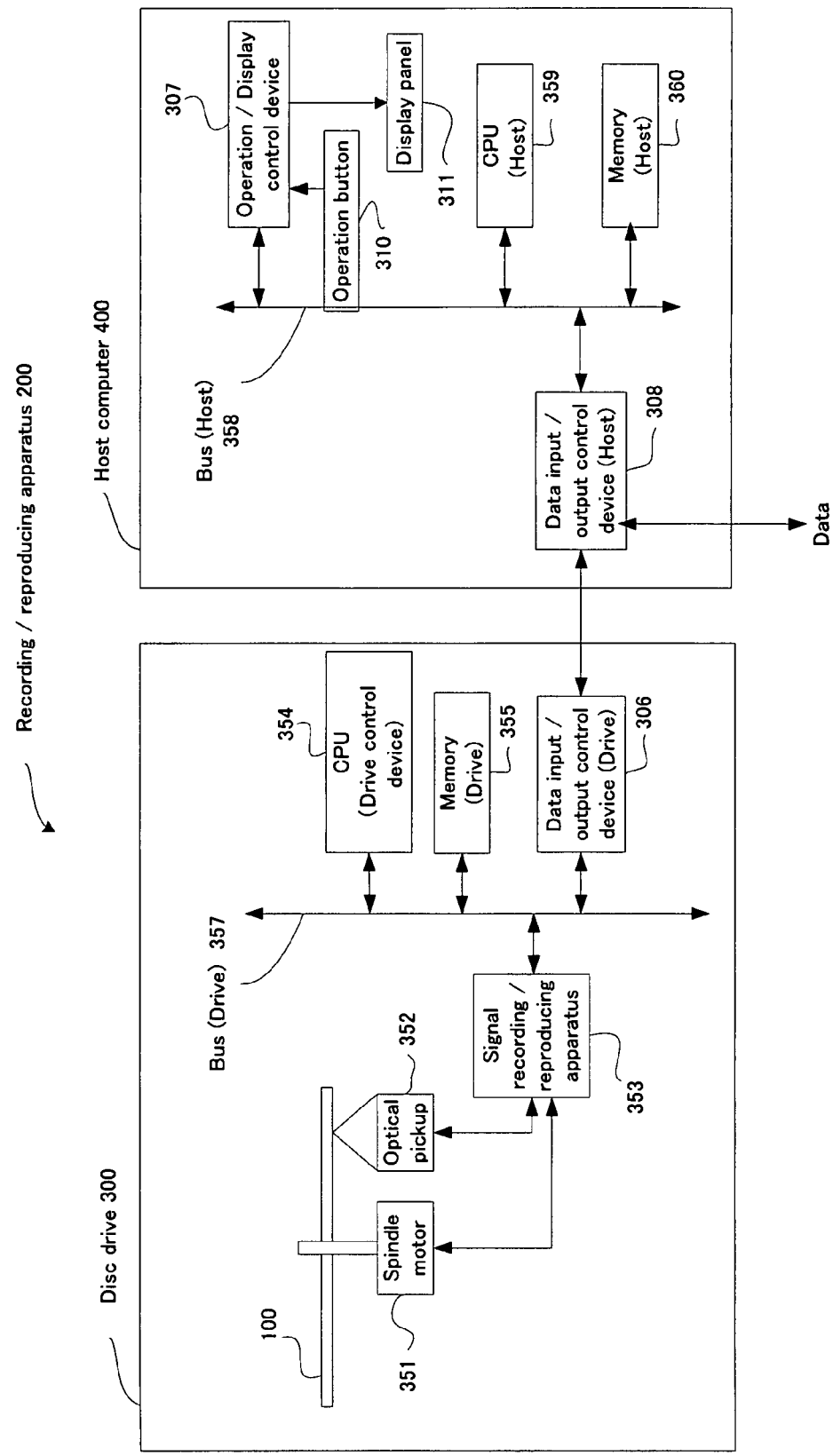

[FIG. 2]
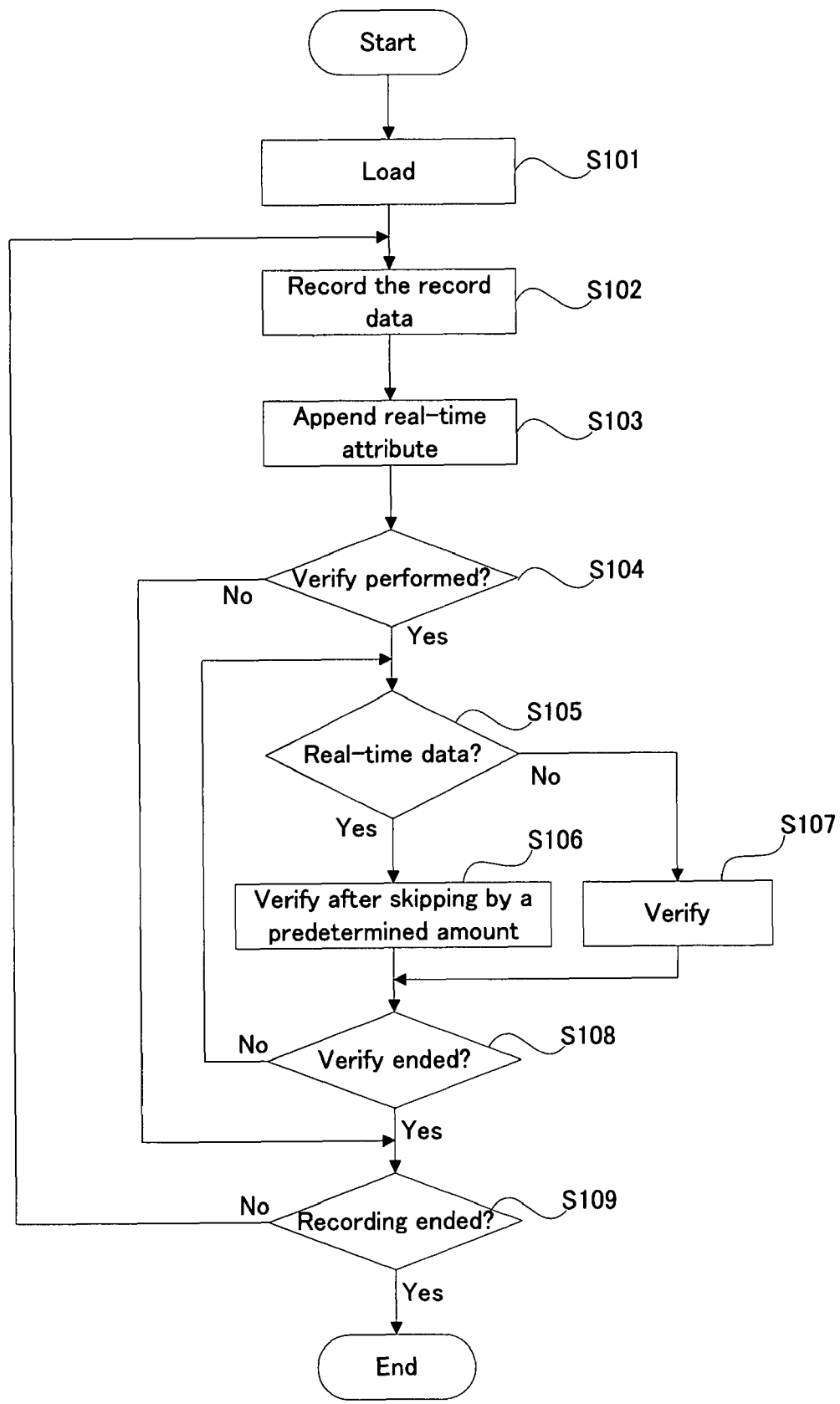

[FIG. 3]
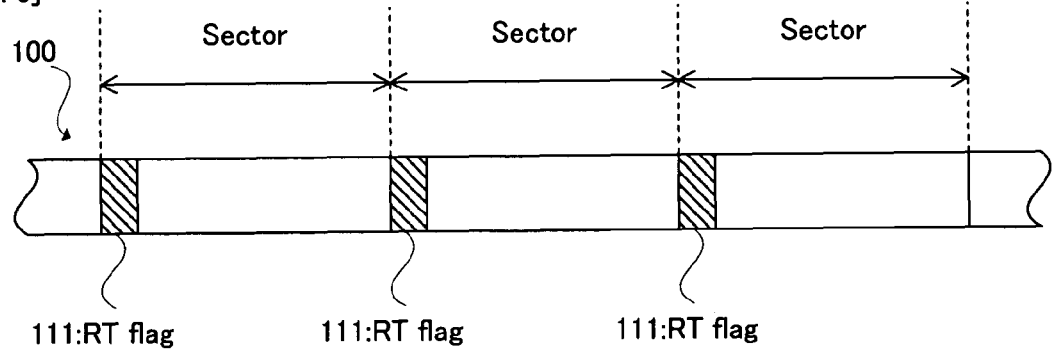
[FIG. 4]
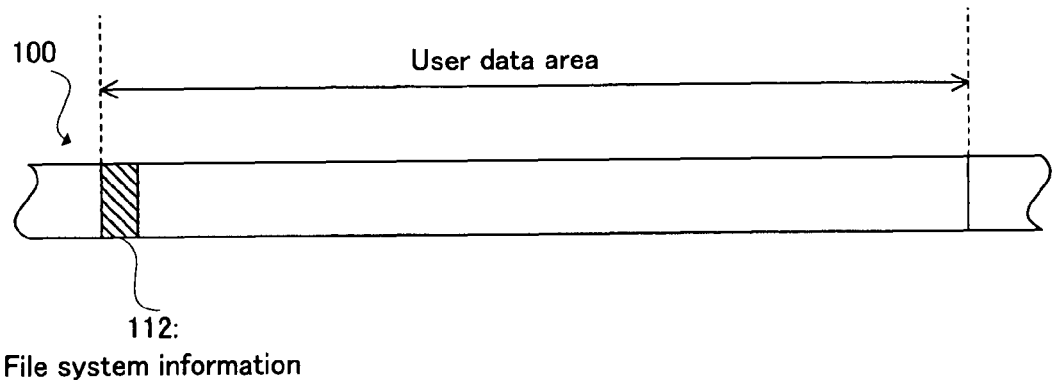
[FIG. 5]
| Address position | Data type |
|---|---|
| 000A~00EF | Management data |
| 00F0~3009 | Real-time data |
| 300A~30EF | Management data |
| 30F0~A009 | Real-time data |
| ⋮ | ⋮ |
113

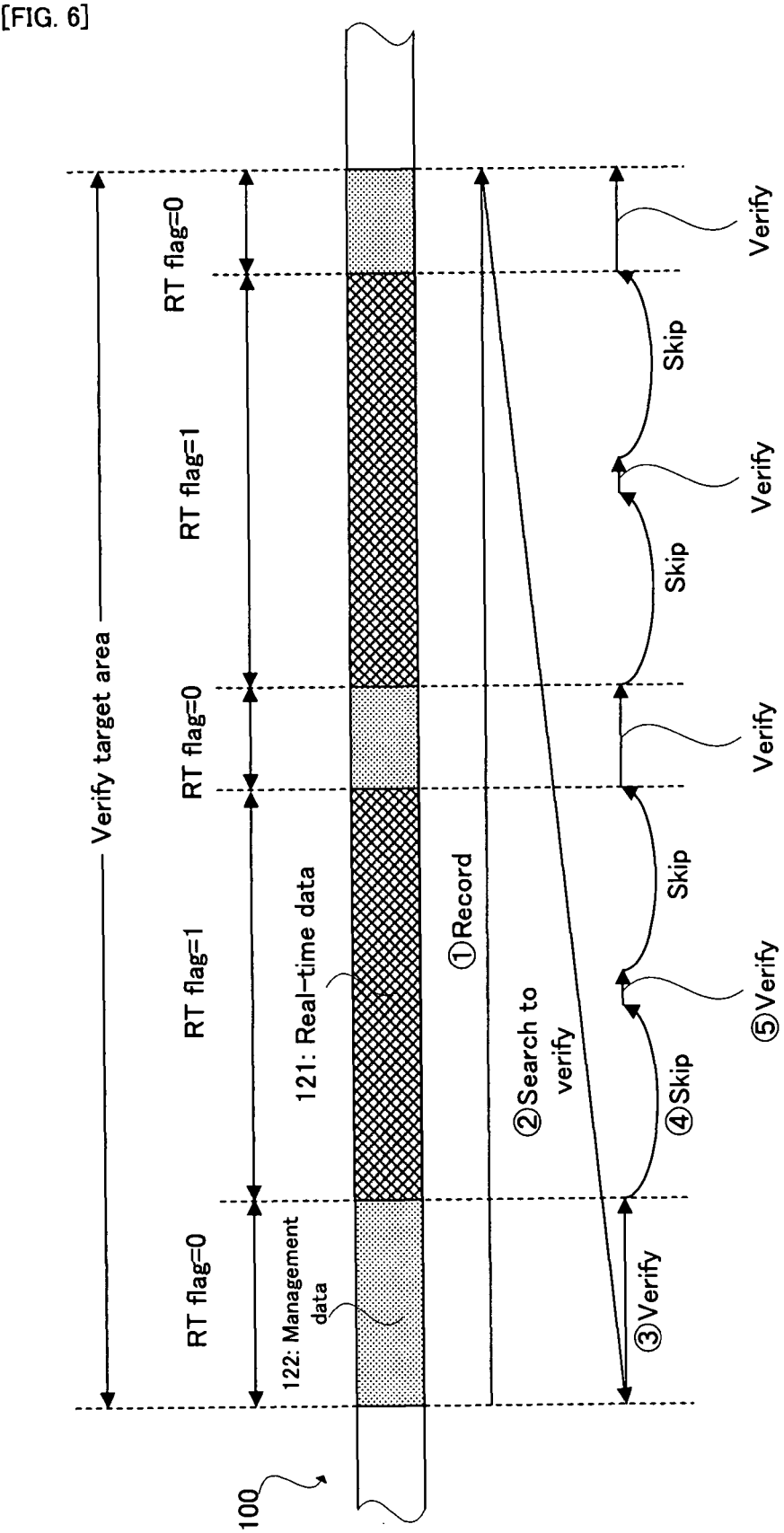
[FIG. 6]

[FIG. 7]
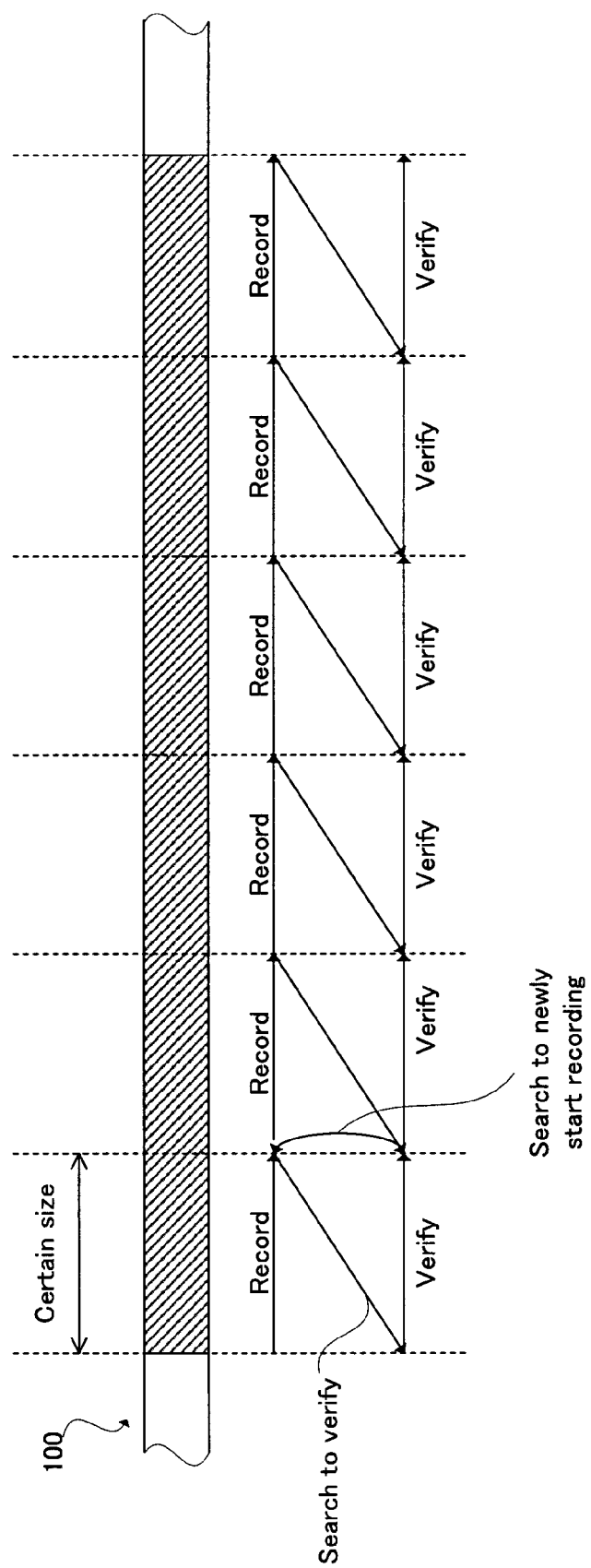

[FIG. 8]
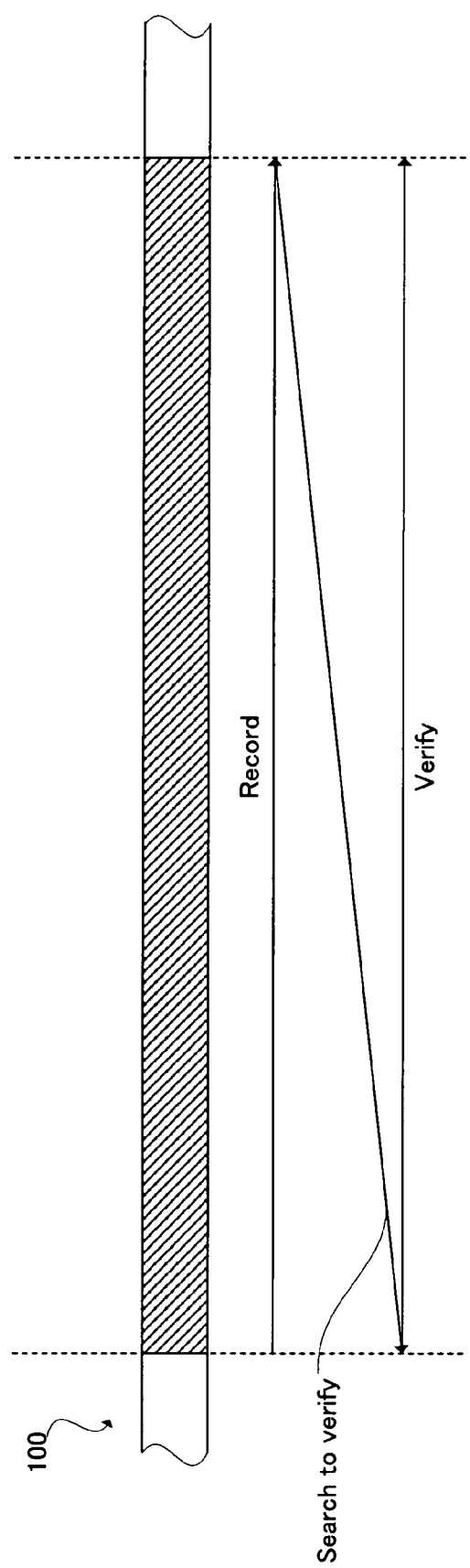

[FIG. 9]
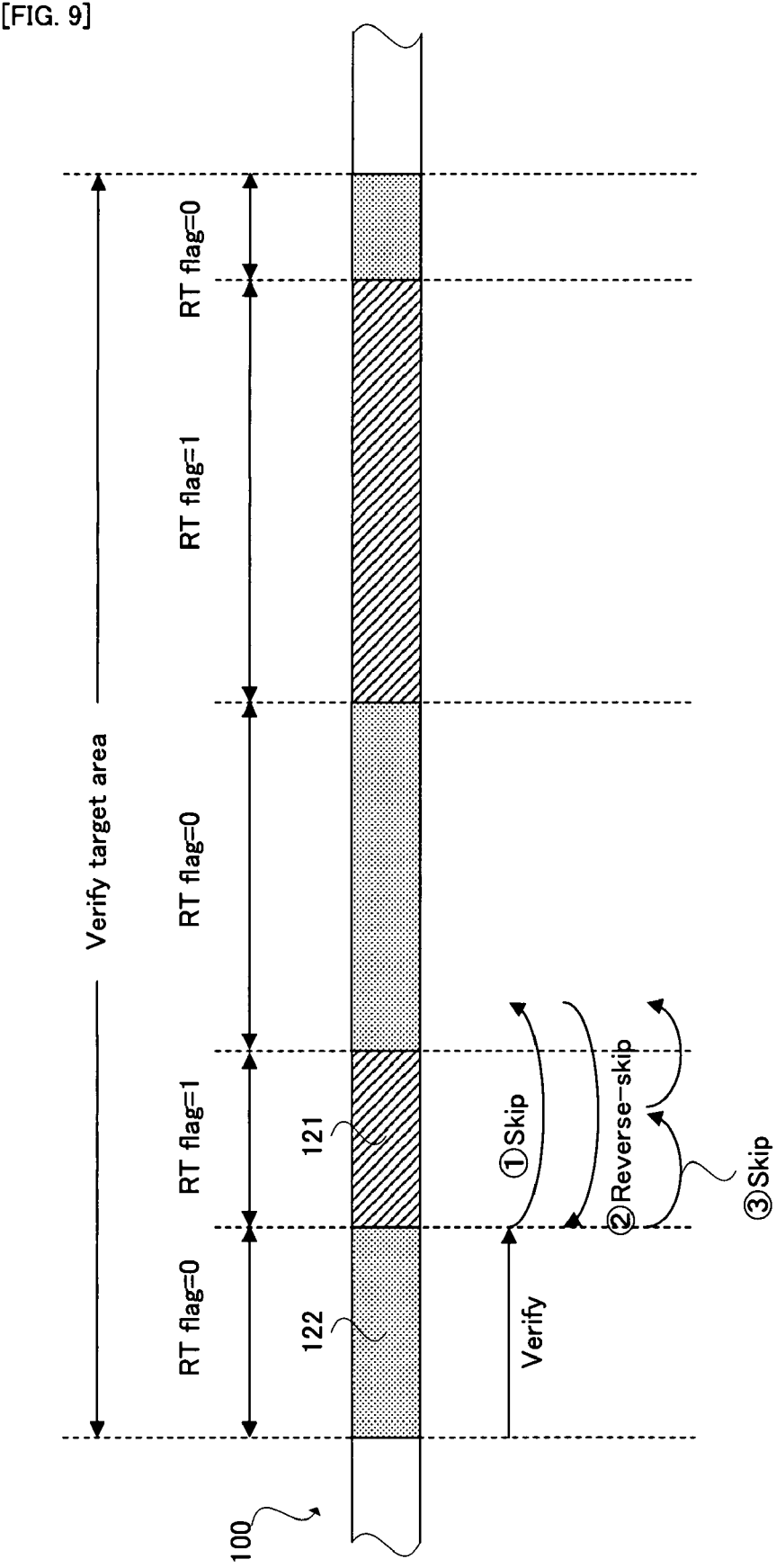

RECORDING DEVICE AND METHOD, AND COMPUTER PROGRAM

TECHNICAL FIELD

The present invention relates to a recording apparatus and method, such as, for example, a DVD recorder, and a computer program which makes a computer function as the information recording apparatus.

BACKGROUND ART

In recording data onto a high-density recording medium, such as an optical disc, a magnetic disk, and a magneto optical disc, a verify process (examination process) of the recorded data is performed, whereby the reliability of data recording and reading can be improved. Specifically, the verify process is performed so as to judge whether or not the data is accurately recorded, whether or not the data can be accurately read (or reproduced), and so on, on the basis of the reproduction quality of the recorded data (e.g. a reproduction error rate, jitter value, etc.).

Such a verify process is performed on the basis of the following two methods. One method is to record data into a recording area specified by a write command, which is outputted from a host to a disc drive, and to verify the recording area in which the data is recorded. Then, this operation is repeated throughout the entire recording medium (or the entire recording area in which the data is to be recorded). Moreover, another method is to record data onto the entire recording medium (or the entire recording area in which the data is to be recorded), and then to verify the entire recording medium (or the entire recording area in which the data is to be recorded).

DISCLOSURE OF INVENTION

Subject to be Solved by the Invention

However, such a verify process generally requires a long time. The time required for the verify process increases as the recording medium has a larger recording capacity. For example, out of Blu-ray Discs which are currently under development, a recording medium with a single recording layer has a recording capacity of 23 GB. If data is recorded onto this recording medium with the verify process performed, it takes about 1 hour to record the data, and furthermore, about 1 hour to perform the verify process. Namely, it takes about 2 hours to record data onto one recording medium, so that there is a problem of lack in practicality.

On the other hand, in order to reduce a time required for the data recording, it is also considered that the verify process is not performed. However, not performing the verify process is far from being good in terms of the improvement in the reliability of data recording and reading.

It is therefore an object of the present invention to provide a recording apparatus and method which ensure preferable recording of data, yet which can relatively reduce a data recording time, as well as a computer program which makes a computer function as such a recording apparatus.

Means for Solving the Subject (Recording Apparatus)

The above object of the present invention can be achieved by a recording apparatus provided with: a recording device for recording record data onto a recording medium, the record data including real-time data which is continuously recorded by a certain amount and management data which is to manage at least one of recording and reproduction of the real-time data; a verifying device for verifying whether or not the recorded record data is accurately recorded; and a first controlling device for controlling the verifying device so as to selectively verify whether or not the management data is accurately recorded, out of the recorded record data.

According to the recording apparatus of the present invention, by virtue of the operation of the recording device, the real-time data and the management data are recorded onto the recording medium. The real-time data is the record data necessary to be physically continuously recorded onto the recording medium by the certain amount. In other words, the real-time data is the record data which cannot ensure the preferable reproduction if it is not physically continuously recorded by the certain amount. The management data is the record data for managing at least one of the recording and reproduction of the real-time data. By reading the management data, the preferable recording operation and reproduction operation are realized. Then, with regard to the record data recorded by the operation of the recording device, it is verified whether or not the record data is accurately (or without any particular disadvantage) recorded (the verify process is performed), by virtue of the operation of the verifying device.

Particularly in the present invention, by virtue of the operation of the first controlling device, the verifying device is controlled so as to verify whether or not the management data out of the record data is accurately recorded. Therefore, without verifying whether or not all the record data is accurately recorded, it is selectively verified whether or not at least the management data is accurately recorded. Thus, a time required for the verify operation can be reduced more than the case where it is verified whether or not all the record data is accurately recorded. By this, it is possible to reduce a time required for the recording operation of the record data.

Moreover, according to the operation of the first controlling device, it is not verified whether or not the real-time data is accurately recorded. However, the real-time data including motion picture data and music data or the like has a relatively large data size, so that an error in a relatively small recording area has little influence on the reading and reproduction of the real-time data. For example, in many cases, the influence is nearly equal to the influence of noise appearing for a moment in a normal motion picture. Therefore, even if the verify operation is not performed with respect to the real-time data, that has little influence on the reading and reproduction of the record data, and it does not cause a disadvantage. In other words, there is no particular disadvantage in terms of preferable recording of the record data.

Consequently, according to the recording apparatus of the present invention, it is possible to reduce the time required to record the record data, while ensuring the preferable recording of the record data.

In one aspect of the recording apparatus of the present invention, it is further provided with a second controlling device for controlling the verifying device so as to selectively verify whether or not one portion of the real-time data is accurately recorded, out of the recorded record data.

According to this aspect, by virtue of the operation of the second controlling device, the verifying device is controlled so as to verify whether or not one portion of the real-time data is accurately recorded, out of the record data. Namely, without verifying whether or not all the real-time data is accurately recorded, it is selectively verified whether or not one portion of the real-time data is accurately recorded. In other words, the verify operation is not performed, except the recording area in which the one portion real-time data is recorded. Namely, that recording area is skipped. Thus, the time required for the verify operation can be reduced more than the case where it is verified whether or not all the record data is accurately recorded. This enables the reduction in the time required for the recording operation of the record data.

Moreover, according to the operation of the second controlling device, it is not verified whether or not all the real-time data is accurately recorded. However, the real-time data including motion picture data and music data or the like has a relatively large data size, so that an error in a relatively small recording area has little influence on the reading and reproduction of the real-time data. For example, in many cases, the influence is nearly equal to the influence of noise appearing for a moment in a normal motion picture. Therefore, even if the verify operation is not performed on all the real-time data, that has little influence on the reading and reproduction of the record data, and it does not cause a disadvantage. In other words, there is no particular disadvantage in terms of preferable recording of the record data.

In an aspect of the recording apparatus provided with the second controlling device, as described above, the second controlling device controls the verifying device so as to verify whether or not a data portion which is distributed by each predetermined size, out of the real-time data, is accurately recorded, as the one portion of the real-time data.

By virtue of such construction, it can be verified whether or not the real-time data is accurately recorded, with skipping the recording area that has a data size corresponding to the predetermined size.

Incidentally, if the management data is recorded in the recording area that is a destination of skipping the recording area with the data size corresponding to the predetermined size, it is considered that both the management data and the real-time data are recorded in the skipped recording area. In this case, it is necessary to verify whether or not the management data is accurately recorded, so that the verify operation is preferably performed again after returning to the recording area that is skipped. At this time, it may be constructed to skip the recoding area with a smaller data size than the predetermined size, which is the size of the recording area to be originally skipped, after returning to the recording area that is skipped. By virtue of such construction, it is possible to significantly reduce the time required for the verify operation.

In an aspect of the recording apparatus in which the data portion which is distributed in each predetermined size is accurately recorded, as described above, the second controlling device controls the recording device so as to verify whether or not the data portion which is distributed by each data recording unit as the predetermined size is accurately recorded, the data recording unit being a unit by which the real-time data is continuously recorded.

By virtue of such construction, the verify operation is performed, with skipping only the recording area corresponding to the data recording unit of the real-time data. Since the verify operation is performed with skipping only the recording area corresponding to the data recording unit, for example, if all the real-time data is recorded on the recording medium in the size of the data recording unit, all the real-time data can be skipped. Therefore, it is no longer necessary to perform the verify operation on the real-time data, and it is possible to further reduce the time required for the verify operation.

In an aspect of the recording apparatus in which the data portion which is distributed by each predetermined size is accurately recorded, as described above, it is further provided with an adjusting device for adjusting the predetermined size.

By virtue of such construction, the size of the recording area to be skipped can be changed (adjusted), as occasion demands. If priority is given to reducing the time required to record the record data, the adjustment can be performed to relatively increase the size of the recording area to be skipped. On the other hand, if priority is given to improving the reliability of the recording and reading of the record data, the adjustment can be performed to relatively reduce the size of the recording area to be skipped. Thus, it is possible to realize the preferable verify operation in response to the situation at any given time.

In another aspect of the recording apparatus of the present invention, the recording device appends a real-time flag to the real-time data and records it, and the first controlling device controls the verifying device so as to selectively verify the management data with reference to the real-time flag.

According to this aspect, by referring to the real-time flag indicating that the record data recorded in the recording area is the real-time data, it is possible to relatively easily recognize whether the record data recorded on the recording medium (particularly, in the recording area targeted for the verify operation, out of the recording medium) is the real-time data or the management data. In particular, since the real-time flag is recorded on the recording medium in such a form that it is appended to the real-time data, it is possible to recognize whether the record data is the real-time data or the management data, relatively easily and quickly.

In another aspect of the recording apparatus of the present invention, the recording device records, onto the recording medium, position information indicating a recording position of the real-time data on the recording medium (or distribution information indicating a distribution condition of the real-time data on the recording medium), and the first controlling device controls the verifying device so as to selectively verify the management data with reference to the position information.

According to this aspect, by referring to the position information recorded in, for example, file system information described later, it is possible to recognize whether the record data recorded on the recording medium (particularly, in the recording area targeted for the verify operation, out of the recording medium) is the real-time data or the management data. In particular, since it is only necessary to refer to the single position information, it is no longer necessary to sequentially refer to the position information at each time of the verify operation of the record data. Therefore, it is possible to recognize whether the record data is the real-time data or the management data, relatively easily.

In another aspect of the recording apparatus of the present invention, it is further provided with a storing device for storing therein position information indicating a recording position of the real-time data on the recording medium (or distribution information indicating the distribution condition of the real-time data on the recording medium), the first controlling device controlling the verifying device so as to selectively verify the management data with reference to the position information.

According to this aspect, by referring to the position information, it is possible to recognize whether the record data recorded on the recording medium (particularly, in the recording area targeted for the verify operation, out of the recording medium) is the real-time data or the management data. In particular, since it is only necessary to refer to the single position information, it is no longer necessary to sequentially refer to the position information at each time of the verify operation of the record data. Therefore, it is possible to recognize whether the record data is the real-time data or the management data, relatively easily.

(Recording Method)

The above object of the present invention can be also achieved by a recording method provided with: a recording process of recording record data onto a recording medium, the record data including real-time data which is continuously recorded by a certain amount and management data which is to manage at least one of recording and reproduction of the real-time data; a verifying process of verifying whether or not the recorded record data is accurately recorded; and a first controlling process of controlling the verifying process so as to selectively verify whether or not the management data is accurately recorded, out of the recorded record data.

According to the recording method of the present invention, it is possible to receive the same various benefits as those of the above-mentioned recording apparatus of the present invention.

Incidentally, in response to the various aspects of the above-mentioned recording apparatus of the present invention, the recording method of the present invention can also adopt various aspects.

(Computer Program)

The above object of the present invention can be also achieved by a computer program for recording control to control a computer provided in above-mentioned recording apparatus of the present invention (including its various aspects), the computer program making the computer function as at least one portion of the recording device, the verifying device, and the first controlling device.

According to the computer program of the present invention, the above-mentioned recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned recording apparatus of the present invention, the computer program of the present invention can also adopt various aspects.

The above object of the present invention can be also achieved by a computer program product of instructions for recording control and for tangibly embodying a program of instructions executable by a computer provided in the recording apparatus of the present invention (including its various aspects), the computer program making the computer function as at least one portion of the recording device, the verifying device, and the first controlling device.

According to the computer program product of the present invention, at least one portion of the recording device, the verifying device, and the first controlling device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function at least one portion of the recording device, the verifying device, and the first controlling device of the present invention described above.

These effects and other advantages of the present invention will become more apparent from the following embodiments.

As explained above, according to the recording apparatus of the present invention, it is provided with the recording device, the verifying device, and the first controlling device, and according to the recording method of the present invention, it is provided with the recording process, the verifying process, and the first controlling process. Therefore, the time to record the record data can be relatively reduced, while ensuring the preferable recording of the record data.

BRIEF DESCRIPTION OF DRAWINGS

FIG. 1 is a block diagram conceptually showing the basic structure of a recording/reproducing apparatus as an embodiment of the recording apparatus of the present invention.

FIG. 2 is a flowchart conceptually showing a flow of an entire recording operation of the recording/reproducing apparatus in the embodiment.

FIG. 3 is a data structure diagram conceptually showing an aspect of directly appending a real-time attribute in each sector as a recording unit of record data.

FIG. 4 is a data structure diagram conceptually showing an aspect of recording the real-time attribute appended to the record data on an optical disc, into file system information.

FIG. 5 is a table conceptually showing an aspect of recording, as a table, an association relationship between the real-time attribute appended to the record data on an optical disc and an address position on the optical disc.

FIG. 6 is an explanatory diagram conceptually showing an operation aspect of a verify process performed by the recording/reproducing apparatus in the embodiment.

FIG. 7 is an explanatory diagram conceptually showing one operation aspect of the verify process performed by the recording/reproducing apparatus in a comparison example.

FIG. 8 is an explanatory diagram conceptually showing another operation aspect of the verify process performed by the recording/reproducing apparatus in the comparison example.

FIG. 9 is an explanatory diagram conceptually showing an aspect of the verify process with reverse-skipping.

DESCRIPTION OF REFERENCE CODES

100 optical disc
111 real-time flag
112 file system information
113 table
121 real-time data
122 management data
200 recording/reproducing apparatus
300 disc drive
352 optical pickup
353 signal recording/reproducing device
354, 359 CPU
355, 360 memory
400 backend host

BEST MODE FOR CARRYING OUT THE INVENTION

Hereinafter, the best mode for carrying out the invention will be explained in order in each embodiment with reference to the drawings.

(1) Basic Structure

Firstly, with reference to FIG. 1, an explanation will be given for the basic structure of a recording/reproducing apparatus 200 as an embodiment associated with the recording apparatus of the present invention. FIG. 1 is a block diagram conceptually showing the basic structure of the recording/reproducing apparatus 200. Incidentally, the recording/reproducing apparatus 200 has a function of recording data onto an optical disc 100 and a function of reading the data recorded on the optical disc 100.

As shown in FIG. 1, the recording/reproducing apparatus 200 is provided with: a disc drive 300 on which the optical disc 100 is actually loaded and on which data recording and reproduction is performed; and a backend host 400 for controlling the data recording and reproduction on the disc drive 300. The backend host 400 corresponds to a host computer, such as, for example, a personal computer or the like.

The disc drive 300 is provided with: a spindle motor 351; an optical pickup 352; a signal recording/reproducing device 353; a CPU (drive control device) 354; a memory 355; a data input/output control device 306; and a bus 357.

Moreover, the backend host 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate the optical disc 100 at a predetermined speed and stop, under spindle servo from a not-illustrated servo unit or the like.

The optical pickup 352 is one specific example of the "recording device" of the present invention. The optical pickup 352 is to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with a laser diode (LD) driver, a head amplifier, and so on, for example. The LD driver drives a not-illustrated semiconductor laser located in the optical pickup 352. The head amplifier amplifies the output signal of the optical pickup 352, namely, the reflected light of a light beam, and outputs the amplified signal. More specifically, the signal recording/reproducing device 353 drives the not-illustrated semiconductor laser located in the optical pickup 352 in order to determine an optimum laser power by a recording process and reproduction process of the OPC pattern, along with a not-illustrated timing generator or the like, under the control of the CPU 354, at the time of OPC (Optical Power Calibration) process.

The memory 355 is used in the general data processing on the disc drive 300, including a buffer area for the record/reproduction data, an area used as an intermediate buffer when data is converted into the data that can be used on the signal recording/reproducing device 353, and the like. Moreover, the memory 355 is provided with: a Read Only Memory (ROM) area into which a program for performing an operation as a recording device, namely, a firmware program is stored; a buffer for temporarily storing the record/reproduction data; a Random Access Memory (RAM) area into which a parameter required for the operation of a firmware program or the like is stored; and the like.

The CPU (drive control device) 354 is connected to the signal recording/reproducing device 353 and the memory 355 via the bus 357, and controls the entire disc drive 300 by giving an instruction to various controlling devices. In general, software for operating the CPU 354 or firmware is stored in the memory 355.

The data input/output control device 306 controls the input/output of the data from the exterior with respect to the disc drive 300, to thereby perform storage to and export from the data buffer on the memory 355. A drive control order, issued from the external host computer 400 which is connected with the disc drive 300 through an interface, such as a SCSI (Small Computer System Interface) and an ATAPI (AT Attachment Packet Interface), is transmitted to the CPU 354 through the data input/output control device 306. Moreover, the record/reproduction data is exchanged with the host computer 400 through the data input/output control device 306 in the same manner.

The operation/display control device 307 receives an operation instruction and performs display with respect to the backend host 400, and transmits an instruction by the operation button 310, such as an instruction to record or reproduce, to the CPU 359. The CPU 359 transmits a control command to the disc drive 300 through the data input/output control device 308 on the basis of instruction information from the operation/display control device 307 and controls the whole disc drive 300. In the same manner, the CPU 359 can transmit a command to request the host to transmit an operation state, with respect to the disc drive 300. By this, the operation state of the disc drive 300, such as during recording and during reproduction, can be recognized, so that the CPU 359 can output the operation state of the disc drive 300 to the display panel 311, such as a fluorescent tube and a LCD, through the operation/display control device 307.

The memory 360 is an internal storage apparatus used by the backend host 400. The memory 360 is provided with: ROM area into which a firmware program, such as a BIOS (Basic Input/Output System), is stored; a RAM area into which parameters required for an operating system and the operation of an application program or the like are stored; and the like.

A hard disk 361 is a magnetic recording medium with a recording capacity of, for example, several tens GB. For example, the hard disk 361 is operable to record thereon various data, such as text data prepared by a user of a personal computer, which is one specific example of the backend host 400, image data, and motion picture data.

One specific example of the recording/reproducing apparatus 200 discussed above can be used by combining the disc drive 300 and the backend host 400, such as a personal computer. The backend host 400, such as a personal computer, and the disc drive 300 are connected through the data input/output control devices 306 and 308, such as a SCSI and an ATAPI, and various applications, such as writing software, installed in the backend host 400 or a general operating system (file system) controls the disc drive 300. As another specific example, there is household equipment, such as recorder equipment for recording and reproducing video images. The recording/reproducing apparatus 200 in this structure records a video signal from a broadcast reception tuner and an external connection terminal, onto the optical disc 100, and outputs the video signal reproduced from the optical disc 100 to external display equipment, such as a television. The operation as the recorder equipment is performed by executing a program stored in the memory 360, on the CPU 359.

(2) Operation Principle

Next, with reference to FIG. 2 to FIG. 8, the operation principle (recording operation) of the recording/reproducing apparatus 200 in the embodiment will be discussed. Here, the operation principle of the recording/reproducing apparatus 200 in the embodiment will be outlined with reference to FIG. 2, and explained in more detail with reference to FIG. 3 to FIG. 8, as occasion demands. FIG. 2 is a flowchart conceptually showing an entire flow of the recording operation of the information recording/reproducing apparatus 200 in the embodiment.

As shown in FIG. 2, firstly, the optical disc 100 is loaded onto the disc drive 300 (step S101). Here, for example, a write strategy to define the waveform of laser light LB in recording the record data may be obtained, or an OPC (Optimum Power Control) process to calculate the optimum power of the laser light LB in recording the record data may be performed.

Then, the record data is actually recorded (step S102). Particularly, in the embodiment, as the record data, real-time data 121 and management data 122 are recorded, wherein the real-time data 121 is necessarily recorded continuously by a certain size of data amount, and the management data 122 is to manage at least one of the recording and reproduction of the real-time data 121. More specifically, the real-time data 121 is such record data that the preferable reading and reproduction of the record data cannot be ensured if the certain amount of data is not physically continuously recorded on the optical disc 100. For example, motion picture data, such as MPEG (Moving Picture Experts Group) and WMV (Windows Media Video), or music data, such as MP3 (MPEG Audio3), or the like can be listed as one example of the real-time data 121. Moreover, the management data 122 is data for managing the recording and reproduction of the motion picture data or the music data or the like. For example, the data recorded in a control data zone, file system information 112, or a VMG (Video Manager) file and a VTSM (Video Title Set Menu) file or the like in case of motion picture data such as MPEG, can be listed as one example of the management data 122.

At this time, the record data is recorded, while appending a real-time attribute indicating whether or not the record data is the real-time data 121 (step S103). The real-time attribute may be directly appended to the record data, for example, as a real-time flag described later. Alternatively, since the real-time attribute is used to recognize the distribution condition of each of the real-time data 121 and the management data 122 on the optical disc 100, the real-time attribute may be indirectly recorded by recording information indicating the distribution condition. The provision of the real-time attribute will be explained in more detail, with reference to FIG. 3 to FIG. 5. FIG. 3 is a data structure diagram conceptually showing an aspect of directly appending a real-time attribute in each sector as a recording unit of the record data. FIG. 4 is a data structure diagram conceptually showing an aspect of recording the real-time attribute appended to the record data on the optical disc 100, into the file system information 112. FIG. 5 is a table conceptually showing an aspect of recording, as a table 113, an association relationship between the real-time attribute appended to the record data on the optical disc 100 and an address position on the optical disc 100c.

As shown in FIG. 3, the real-time attribute may be directly appended in each sector, which is a unit of recording the record data. Incidentally, the data size of 1 sector is 2 KB. Here, as the real-time attribute, a real-time flag 111 is recorded in each sector. Namely, in the sector in which the real-time data 121 is recorded, for example, a flag of "1" is recorded as the real-time flag 111. On the other hand, in the sector in which the management data 122 is recorded, for example, a flag of "0" is recorded as the real-time flag 111.

Incidentally, the real-time flag 111 is standardized in a DVD-RAM and Blue-ray Disc-R, or the like, which are one specific example of the optical disc 100. Of course, obviously, other specific optical discs 100 may also adopt the same structure. Moreover, as described later, the real-time attribute may be appended without using the real-time flag 111.

Moreover, as shown in FIG. 4, in the file system information 112 which is recorded on the optical disc 100 (particularly, in a head portion of a user data area, which is a recording area in which the record data is recorded), the real-time attribute appended to the record data to be recorded on the optical disc may be recorded.

Specifically, as shown in FIG. 5, for example, information indicating the distribution condition of each of the real-time data 121 and the management data 122 on the optical disc 100 may be recorded (refer to FIG. 5). Namely, the table 113 indicating the association relationship between the data type of the record data on the optical disc 100 and the address position on the optical disc 100 may be used to record the real-time attribute of the record data. According to the table 113 in FIG. 5, it indicates that the management data 122 is recorded in a recording area with address positions of "000A" to "00EF", that the real-time data 121 is recorded in a recording area with address positions of "00F0" to "3009", that the management data 122 is recorded in a recording area with address positions of "300A" to "30EF", and that the real-time data 121 is recorded in a recording area with address positions of "30F0" to "A009".

Incidentally, the table 113 shown in FIG. 5 is not necessarily recorded in the file system information 112, and it may be recorded in another recording area on the optical disc 100 (e.g. another recording area of the user data area, or a lead-in area, lead-out area, etc.), or it may be recorded on the memory 360 of the recording/reproducing apparatus 200.

In FIG. 2 again, after that, under the control of the CPU 359 (or CPU 354), it is judged whether or not to perform a verify operation on the record data (step S104). Specifically, if it is desired to improve the reliability of the recording and reading of the record data, it is judged to perform the verify process, and if priority is given to reducing a time required for the recording operation of the record data, it is judged not to perform the verify process.

Incidentally, the verify process in the embodiment indicates a process of verifying whether or not the record data is preferably recorded. The verify process is performed by the operation of the signal recording/reproducing device 353 and the CPU 354 (or CPU 359), which constitute one specific example of the "verifying device" of the present invention. For example, after the record data is recorded, the recorded record data is read or reproduced, whereby the reproduction quality of the record data, such as the reproduction error rate and jitter value (or moreover, degree of modulation, asymmetry, etc.), is measured. If this reproduction quality is inferior to a reference value determined in the standard of the optical disc 100, it is judged that the record data is not preferably recorded, and the record data is recorded again, if necessary. This series of processes corresponds to the verify process in the embodiment.

As a result of the judgment in the step S104, if it is judged not to perform the verify process (the step S104: No), then, under the control of the CPU 359 (or CPU 354), it is judged whether or not to end the recording operation of the record data (step S109). For example, if all the record data to be recorded in this time's recording operation is already recorded, or for example, if an instruction to end (or pause)

the recording operation is given by a user of the recording/reproducing apparatus 200 using the operation button 310, or in similar cases, it is judged to end the recording operation.

As a result of the judgment in the step S109, if it is judged not to end the recording operation (the step S109: No), the operational flow returns to the step S102 again, to continue the recording operation. On the other hand, if it is judged to end the recording operation (the step S109: Yes), the recording operation is ended. If necessary, a finalize process may be performed, or the optical disc 100 may be ejected from the recording/reproducing apparatus 200 (specifically, the disc drive 300).

On the other hand, as a result of the judgment in the step S104, if it is judged to perform the verify process (the step S104: Yes), then, under the control of the CPU 359 (or CPU 354), it is judged whether or not the record data recorded in the recording area targeted for the verify process (particularly, the recording area that the verify process is about to be performed) is the real-time data 121 (step S105). Specifically, with reference to the real-time attribute (refer to FIG. 3 to FIG. 5) appended in the step S103, it is judged whether or not the record data recorded in the recording area targeted for the verify process is the real-time data 121.

Alternatively, it may be constructed to refer to the real-time attribute included in a command indicated by streaming bit=1, in a write command (i.e. an instruction to record the record data) outputted from the backend host 400 to the disc drive 300 in the step S102. The point is that the presence or absence of the real-time attribute may be judged by using the procedure of the data processing in the recording operation, even if the real-time attribute, such as the real-time flag 111, is not necessarily recorded on the optical disc 100.

Incidentally, the recording area targeted for the verify process is specified by a command outputted from the backend host 400 (specifically, the CPU 359) to the disc drive 300. Specifically, the recording area in which the record data is recorded is specified as the recording area targeted for the verify process.

As a result of the judgment in the step S105, if it is judged that the record data recorded in the recording area targeted for the verify process is not the real-time data 121 (i.e. that it is the management data 122) (the step S105: No), under the control of the CPU 359 (or CPU 354), which is one specific example of the "first controlling device" of the present invention, the verify process is performed on the management data 122 (step S107). Namely, if the record data recorded in the recording area targeted for the verify process is not the real-time data 121 but the management data 122, the verify process is performed on all the management data 122. Then, the operational flow goes to a step S108.

On the other hand, as a result of the judgment in the step S105, if it is judged that the record data recorded in the recording area targeted for the verify process is the real-time data 121 (the step S105: Yes), under the control of the CPU 359 (or CPU 354), which is one specific example of the "second controlling device" of the present invention, the verify process is performed in the recording area that is a destination of skipping in a predetermined size (step S106). Specifically, for example, the verify process is performed in the recording area that is a destination of skipping a recording area corresponding to a data size of 1 MB, as the predetermined size. Alternatively, for example, the verify process is performed in the recording area that is a destination of skipping a recording area corresponding to 10 recording tracks, as the predetermined size. At this time, the verify process is not performed in the skipped recording area (specifically, the recording area with the data size of 1 MB, or the recording area corresponding to 10 recording tracks). As described above, if the record data recorded in the recording area targeted for the verify process is the real-time data 121, the verify process is not performed on all the real-time data 121, and the verify process is performed selectively on one portion of the real-time data 121.

After that, under the control of the CPU 359 (or CPU 354), it is judged to end the verify process (step S108). Namely, if the verify process is already ended with respect to the entire recording area targeted for the verify process, which is specified by the command outputted from the backend host 400 to the disc drive 300, or for example, if an instruction to end (or pause) the verify process is given by a user of the recording/reproducing apparatus 200 using the operation button 310, or in similar cases, it is judged to end the verify process.

As a result of the judgment in the step S108, if it is judged not to end the verify process (the step S108: No), the operational flow returns to the step S105 again, to continue the above-mentioned verify process. On the other hand, if it is judged to end the verify process (the step S108: Yes), the verify process is ended, and the operational flow goes to the step S109.

The above-mentioned verify process will be discussed in more detail, with reference to FIG. 6. FIG. 6 is an explanatory diagram conceptually showing an operation aspect of the verify process performed by the recording/reproducing apparatus 200 in the embodiment.

As shown in FIG. 6, it is assumed that the hatching portion out of the recording area on the optical disc 100 is the recording area targeted for the verify process (hereinafter, referred to as a "verify target area"). Moreover, it is also assumed that it is possible to recognize whether the record data recorded in the verify target recording area is the real-time data 121 or the management data 122, by using the real-time flag 111 (RT flag) explained with reference to FIG. 3. Namely, the recording/reproducing apparatus 200 can recognize that the real-time data 121 is recorded in the recording area if the real-time flag 111 is "1", and that the management data 122 is recorded in the recording area if the real-time flag 111 is "0". In a case where the verify process is performed in the verify target area, it is premised that the record data is firstly recorded into the verify target area, and then the head portion of the verify target area is searched. Namely, as shown by arrows (1) and (2) in FIG. 6, the objective lens of the optical pickup 352 is displaced (tracked). Then, the verify process is performed with reference to the real-time flag 111 (the real-time attribute), as described above. Specifically, in the recording area with the real-time flag 111 of "0" (i.e. the recording area in which the management data 122 is recorded), the verify process is performed throughout the entire area. Namely, the objective lens of the optical pickup 352 is displaced as shown by an arrow (3) in FIG. 6. On the other hand, in the recording area with the real-time flag 111 of "1" (i.e. the recording area in which the real-time flag 111 recorded), the verify process is performed for a certain period of time (or by a certain size) in the recording area that is a destination of the skipping in a predetermined size. Namely, as shown by arrows (4) and (5) in FIG. 6, the objective lens of the optical pickup 352 is displaced.

At this time, the real-time flag 111 is referred to even in the recording area that is the skip destination, and it is judged whether or not the real-time data 121 is recorded in the relevant recording area, and the predetermined size of skipping is repeated. This predetermined size of skipping is repeated until the recording area in which the verify process is about to be performed becomes the recording area in which the management data 122 is recorded. Namely, as shown in FIG. 6, the predetermined size of skipping is repeated until the real-time flag 111 in the recording area that is the skip destination becomes "0".

Now, the comparison example of the verify process performed by the recording/reproducing apparatus 200 in the embodiment will be explained with reference to FIG. 7 and FIG. 8. Each of FIG. 7 and FIG. 8 is an explanatory diagram conceptually showing the operation aspect of the verify process performed by the recording/reproducing apparatus in the comparison example.

As shown in FIG. 7, in one operation aspect of the verify process in the comparison example, tracing to record the record data in each certain size (e.g. in each one sector), searching for the head portion of the recording area in which the record data is recorded (i.e. searching to verify), the verify process of the record data, and searching for the head portion of the recording area in which the record data is to be recorded next (i.e. searching to newly start the recording) are preformed. Therefore, if this process is repeated n times on the entire optical disc, a time required to record the record data onto the optical disc is {(a time required for the tracing to record the record data in the certain size)+(a time required for the searching for the head portion of the recording area in which the record data is recorded)+(a time required for the verify process of the record data)+(a time required for the searching for the head portion of the recording area in which the record data is to be recorded next)}×n=(a time required for the tracing to record the record data onto the entire optical disc)+(a time required for the verify process on the entire optical disc)+(a time required for the searching)×2n. Namely, it needs (a time required for the tracing on the entire optical disc)×2+(a time required for close-range searching (searching in the recording area located in a relatively close range))× 2n.

Moreover, as shown in FIG. 8, in another operation aspect of the verify process in the comparison example, tracing to record the record data onto the entire optical disc, searching for the head portion of the recording area with the record data recorded (i.e. searching to verify), and the verify process on the entire optical disc are preformed. Therefore, a time required to record the record data onto the optical disc is (a time required for the tracing to record the record data onto the entire optical disc)+(a time required for the verify process on the entire optical disc)+(a time required for the searching). Namely, it needs (a time required for the tracing on the entire optical disc)×2+(a time required for the searching in all the recording areas).

Every verify process requires a time in which the tracing on the entire optical disc can be performed at least twice, which increases the time required to record the record data.

However, according to the recording/reproducing apparatus 200 in the embodiment, with regard to the time necessary to record the record data onto the entire optical disc 100, the time required for the verify process can be reduced more than the comparison example in FIG. 7 and FIG. 8. Namely, in the comparison example in FIG. 7 and FIG. 8, the time required for the verify process is equal to the time required for the tracing on the entire optical disc. However, in the embodiment, the time required for the verify process can be reduced by a time required for tracing the recording area to be skipped. For example, it is assumed that a time required for tracing the recording area to be skipped in one skip operation (i.e. a time required for the verify process in the recording area to be skipped in one skip operation) is 30 seconds and that the skip operation is performed 100 times on the entire optical disc 100. In that case, the time required for the verify process can be reduced by 30×100=3000 seconds=50 minutes. For example, it takes 2 hours to record the record data onto the optical disc while performing the verify process in the comparison example; however, it takes only about one hour, which is nearly half, when the record data is recorded onto the optical disc 100 while performing the verify process in the embodiment. As a result, there is such a great advantage that the time required to record the record data can be greatly reduced.

Furthermore, the real-time data 121 is the entity of contents recorded on the optical disc 100, so that its data size is larger than that of the management data 122. Thus, by skipping the real-time data 121 with a relatively large data size and performing the verify process intermittently or selectively, it is possible to reduce the tracing time required for the verify process, more efficiently and greatly, as compared to the time required for the tracing on the entire optical disc.

Moreover, the real-time data 121 including motion picture data and music data or the like has a relatively large data size, so that an error in a relatively small recording area has little influence on the reading and reproduction of the real-time data 121. For example, in many cases, the influence is nearly equal to the influence of noise appearing for a moment in a normal motion picture. Therefore, even if the verify process is performed with the real-time data 121 skipped, that has little influence on the reading and reproduction of the record data. Thus, priority can be given more to reducing the time required to record the record data by performing the verify process with the real-time data 121 skipped, than to increasing the reliability of the recording and reading of the record data by performing the verify process throughout the entire optical disc 100.

Incidentally, it may be constructed not to perform the verify process at all in the recording area in which the real-time data 121 is recorded. Namely, instead of skipping the recording area in the certain size, it may be constructed to skip the entire recording area in which the real-time data 121 is recorded. At this time, in case of a DVD as one specific example of the optical disc 100, the standards define that the real-time data 121 with a data size of at least 16 MB is physically continuously recorded on the optical disc 100. Therefore, in this case, it may be constructed to skip the 16 MB recording area, as the initial setting. Alternatively, in case of a Blu-ray Disc as one specific example of the optical disc 100, the standards define that the real-time data 121 with a data size of at least 24 MB to 80 MB is physically continuously recorded on the optical disc 100. Therefore, in this case, it may be constructed to skip the 24 MB to 80 MB recording area, as the initial setting. This enables greater reduction in the time required to record the record data.

Moreover, if the certain size of the recording area is skipped, it may be constructed to change the certain size, as occasion demands, under the control of the CPU 359 (or CPU 354), for example, which is one specific example of the "adjusting device" of the present invention. For example, it is assumed that a 50 KB recording area as the certain size is skipped immediately after the recording of the record data is started. If it is desired to further reduce the time required to record the record data, it may be constructed to change it to skip a 200 KB recording area, as the certain size, in the middle of operation. Namely, if priority is given to reducing the time required to record the record data, it may be adjusted to relatively increase the size of the recording area to be skipped. On the other hand, if priority is given to improving the reliability of the recording and reading of the record data, it may be adjusted to relatively reduce the size of the recording area to be skipped.

Incidentally, in the verify process, if it is judged that the record data recorded in the recording area that is the skip destination is not the real-time data 121, for example, as shown in FIG. 9, it is preferably constructed to go back once to the recording area before the skipping (perform reverse-skipping) and perform the verify process again. FIG. 9 is an explanatory diagram conceptually showing an aspect of the verify process with the reverse-skipping.

As shown in FIG. 9, it is assumed that the record data recorded in the recording area that is the skip destination is not the real-time data 121. In this case, as shown by an arrow (2) in FIG. 9, the objective lens of the optical pickup 352 is displaced so as to go back again to the recording area before the skipping (perform reverse-skipping). After that, the verify process is performed to skip the recording area in the predetermined size again. At this time, it is preferably constructed to skip the recording area with a smaller data size than that of the recording area skipped in the first skip operation. Namely, as shown by an arrow (3) in FIG. 9, for example, the recording area that has a half of the data size of the recording area skipped in the first skip operation is skipped. After that, it is judged again whether or not the record data recorded in the recording area that is the skip destination is the real-time data 121, and the verify process is performed.

Incidentally, it may be constructed such that even if the recording area that has a smaller data size than that of the recording area skipped in the first skip operation is not skipped, the verify process is performed in order from, for example, the recording area before the skipping. However, from the viewpoint that priority is given to reducing the time required for the verify process (which is eventually the time required to record the record data), it is preferably constructed to skip again the recording area with a smaller data size than that of the recording area skipped in the first skip operation, Moreover, as in the comparison example in FIG. 7, it may be constructed to record the record data in each certain size and perform the verify process on the record data. Alternatively, as in the comparison example in FIG. 8, it may be constructed such that after the record data is recorded onto the entire optical disc 100, the verify process is performed on the entire optical disc 100. In any recording aspects, it is possible to reduce the time required to record the record data, by performing the selective verify process described above.

Moreover, in the above-mentioned embodiment, as the record data on which the selective verify process is performed, the real-time data 121, such as, for example, motion picture data and music data, is explained as one example; however, it is not limited to this. In particular, in case of any data in which an error has little influence on the reproduction of the record data, the time required to record the record data can be reduced by performing the selective verify process, as in the real-time data 121.

Moreover, in the above-mentioned embodiment, the optical disc 100 is explained as one example of the recording medium, and the recorder or player associated with the optical disc 100 is explained as one example of the recording/reproducing apparatus. The present invention, however, is not limited to the optical disc and the recorder thereof, and can be applied to other various recording media which support high-density recording and high transfer rate, and the recorder or player thereof.

The present invention is not limited to the above-mentioned embodiment, and various changes may be made, if desired, without departing from the essence or spirit of the invention which can be read from the claims and the entire specification. A recording apparatus and method, and a computer program for recording control, which involve such changes, are also intended to be within the technical scope of the present invention.

INDUSTRIAL APPLICABILITY

The recording apparatus and method, and the computer program of the present invention can be applied to a recording apparatus, such as, for example, a DVD recorder. Moreover, they can be applied to a recording apparatus or the like, which is mounted on or can be connected to various computer equipment for consumer use or business use, for example.

The invention claimed is:

1. A recording apparatus comprising:
   a recording device for recording record data onto a recording medium, the record data including real-time data which is continuously recorded by a certain amount and management data which is to manage at least one of recording and reproduction of the real-time data;
   a verifying device for verifying whether or not the recorded record data is accurately recorded; and
   a first controlling device for controlling said verifying device so as to selectively verify whether or not the management data is accurately recorded, out of the recorded record data.

2. The recording apparatus according to claim 1, further comprising a second controlling device for controlling said verifying device so as to selectively verify whether or not one portion of the real-time data is accurately recorded, out of the recorded record data.

3. The recording apparatus according to claim 2, wherein said second controlling device controls said verifying device so as to verify whether or not a data portion which is distributed by each predetermined size, out of the real-time data, is accurately recorded, as the one portion of the real-time data.

4. The recording apparatus according to claim 3, wherein said second controlling device controls said verifying device so as to verify whether or not the data portion which is distributed by each data recording unit as the predetermined size is accurately recorded, the data recording unit being a unit by which the real-time data is continuously recorded.

5. The recording apparatus according to claim 3, further comprising an adjusting device for adjusting the predetermined size.

6. The recording apparatus according to claim 1, wherein said recording device appends and records a real-time flag to the real-time data, and
   said first controlling device controls said verifying device so as to selectively verify the management data with reference to the real-time flag.

7. The recording apparatus according to claim 1, wherein said recording device records, onto the recording medium, position information indicating a recording position of the real-time data on the recording medium, and
   said first controlling device controls said verifying device so as to selectively verify the management data with reference to the position information.

8. The recording apparatus according to claim 1, further comprising a storing device for storing therein position information indicating a recording position of the real-time data on the recording medium,
   said first controlling device controlling said verifying device so as to selectively verify the management data with reference to the position information.

9. A recording method comprising:
a recording process of recording record data onto a recording medium, the record data including real-time data which is continuously recorded by a certain amount and management data which is to manage at least one of recording and reproduction of the real-time data;
a verifying process of verifying whether or not the recorded record data is accurately recorded; and
a first controlling process of controlling said verifying process so as to selectively verify whether or not the management data is accurately recorded, out of the recorded record data.

* * * * *